(12) United States Patent
Smith et al.

(10) Patent No.: US 11,662,355 B2
(45) Date of Patent: May 30, 2023

(54) INTERACTIVE AND ITERATIVE METHOD AND SYSTEM FOR USING FEEDBACK TO MAKE MEASUREMENTS, MANAGE DATA, AND PRINTING AND SCANNING ANYTHING IN REAL TIME AND NON-REAL TIME

(71) Applicants: John Smith, Westmont, IL (US); Marie Smith, Westmont, IL (US); Mary Smith, Westmont, IL (US)

(72) Inventors: John Smith, Westmont, IL (US); Marie Smith, Westmont, IL (US); Mary Smith, Westmont, IL (US)

( * ) Notice: Subject to any disclaimer, the term of this patent is extended or adjusted under 35 U.S.C. 154(b) by 461 days.

(21) Appl. No.: 15/287,212

(22) Filed: Oct. 6, 2016

(65) Prior Publication Data

US 2019/0056417 A1 Feb. 21, 2019

(51) Int. Cl.
*G01N 35/00* (2006.01)
*G01D 21/00* (2006.01)

(52) U.S. Cl.
CPC ....... *G01N 35/00871* (2013.01); *G01D 21/00* (2013.01); *G01N 2035/00881* (2013.01)

(58) Field of Classification Search
CPC .............................................. G01N 35/00871
USPC ....................................................... 702/188
See application file for complete search history.

(56) References Cited

U.S. PATENT DOCUMENTS

| | | | | |
|---|---|---|---|---|
| 7,552,030 B2 * | 6/2009 | Guralnik | ............ | G06K 9/00496 |
| | | | | 702/188 |
| 2004/0172222 A1* | 9/2004 | Simpson | .............. | G06F 19/3418 |
| | | | | 702/189 |
| 2016/0091871 A1* | 3/2016 | Marti | ........................ | G06F 3/01 |
| | | | | 702/188 |
| 2016/0195856 A1* | 7/2016 | Spero | ..................... | G06N 5/046 |
| | | | | 700/90 |

* cited by examiner

*Primary Examiner* — Ricky Go

(57) ABSTRACT

An iterative methodology and system (which can also be represented in software), with the option for continual improvement, for the interactive capture, merger, comparison, analysis, cloning and manipulation of anything in the unique universe medium or multiple universes mediums, be it real, virtual or imagined, including thought (of organic or non-organic or other nature), in real time or non-real time, where anything also includes anything infinitely small (or a small base volume of space known as a Senserom), to infinitely large (or a large encapsulating Senseroom volume known as a Senseverse) and can include multiple universes and Senserooms themselves impacting each other, static or dynamic changing over time periods, including the past, present and future. The full set of these infinite Senseroms and Senserooms is considered the Senseverse, which contains anything and/or everything real, virtual and imagined.

12 Claims, 1 Drawing Sheet

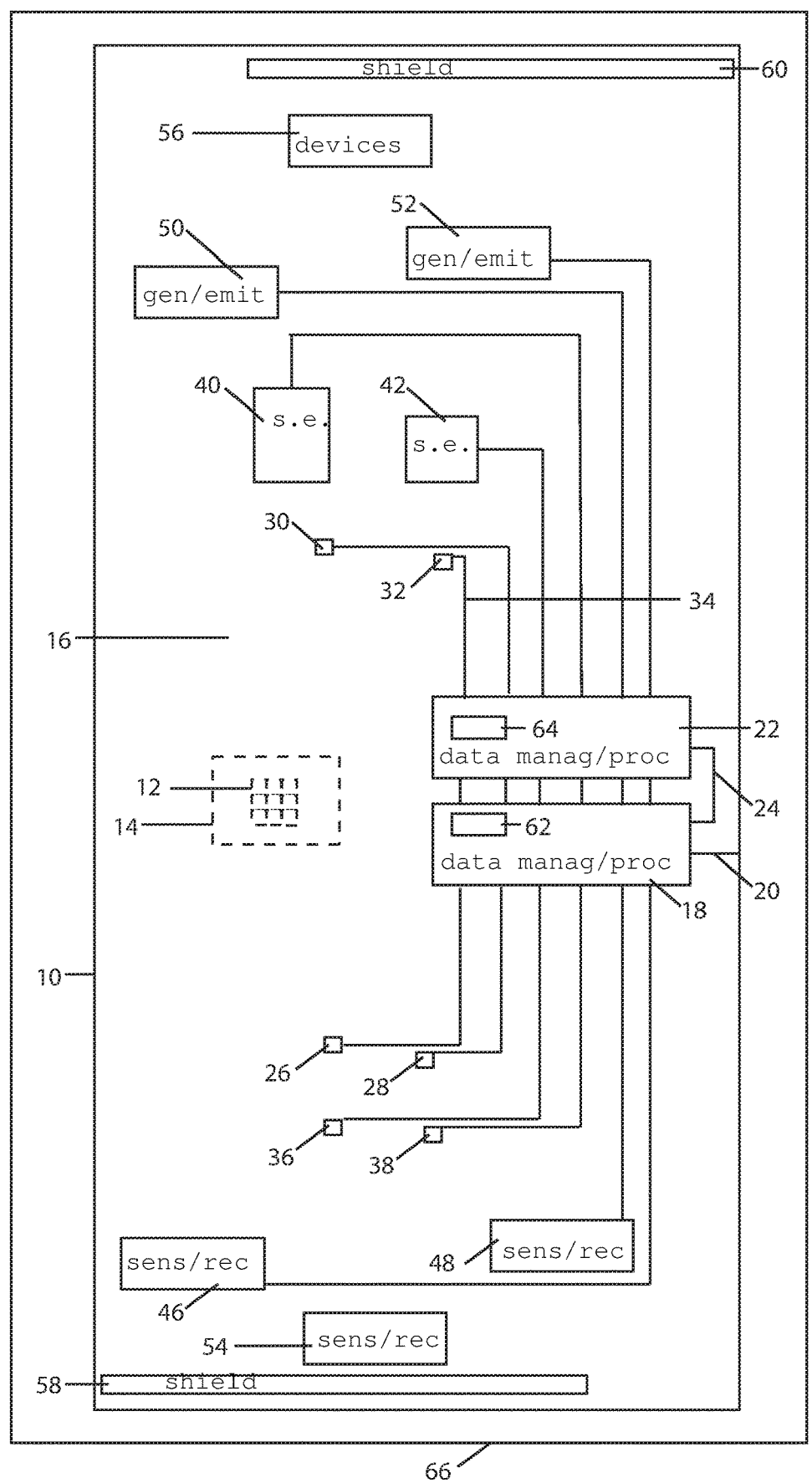

US 11,662,355 B2

INTERACTIVE AND ITERATIVE METHOD AND SYSTEM FOR USING FEEDBACK TO MAKE MEASUREMENTS, MANAGE DATA, AND PRINTING AND SCANNING ANYTHING IN REAL TIME AND NON-REAL TIME

BACKGROUND OF THE INVENTION

The present invention relates to interactive and iterative systems and methods and, more particularly, to interactive and iterative methodologies and systems, with the option for continual improvement for the interactive capture, merger, comparison, analysis, cloning and manipulation of anything in the unique universe medium or multiple universe mediums, be it real, virtual or imagined, over time.

The imaginary concepts that try to explain properties and phenomena of the local unique universe include time, dimensions, length, volume, gravity, energy, pressure, points, equality, numbers, the Cartesian coordinate system, direction, angle, spin, magnetism, polarity, and the like. They could be summarized as properties of perceived or non-perceived matter in the observable universe and the use of patentable methodologies, such as tools, devices and systems, such as the weight scale, the clock, stopwatch, and light meter, are examples of useful tools and systems for measurement, some of which when combined with a methodology have been patented, to observe and compare controlled and naturally occurring properties of events or matter of interest in the universe, be it real, virtual or imagined.

Methodology is central in the use of these patentable inventions, as the intent and use of a device and methodology separates the clock from the stopwatch, as a clock and stopwatch yield the same result and can be indistinguishable if both started at the approximate same time with same units of measure. However, two buttons to start and pause the stopwatch is not part of the clock design, even they both use the imaginary concept of passage of time as a scale of measure of a phenomena or event or subject of interest. A stopwatch yields the same result as a clock if they are started at approximately same time with same power source and same units of measure, until one of the devices terminates as an intended or unintended function of the design of the device itself or by the experimenter.

One can examine a completely theoretical scenario and realize the multiple challenges of an experiment involving a scientist conducting a simple single measurement on the Atlantic ocean on the planet Earth in the Milky Way Galaxy of the local universe, and the inherent resulting conflict in the measurement result, device and methodology for repeatability and comparison universally.

For example, an interning undergraduate scientist, who is farsighted with 9 month old corrective glasses with 3 months experience is riding on a boat in the Atlantic ocean toward New Smyrna Beach, Fla. during high tide on a choppy sea and spots a juvenile great white shark and, meanwhile, tries to drop an anchor with measured chain length to hit any nearby ground as a reference point while casting a measuring length of tape with bobbers into the sea to measure the length of the live swimming juvenile shark just below the ocean surface alongside the boat. The scientist documents the length of the shark to be 7 feet with measurement tolerance of +/−0.5 feet and quickly tags the shark before it swims away and documents the length of the shark, exact time, exact location, tag number, type of shark, gender of shark, estimated age, and date of the encounter into his journal. The information is collected by a research organization and merged with sets of other documented shark spottings by other scientists and documented attacks off the coast of Florida, to determine the ratio of shark attacks on humans to total shark population, which is then broken down by type and size of sharks, for a publically funded research study. The findings of the publicly funded study are published, solutions are proposed to reduce the number of shark attacks on humans locally, and prompt action is taken to fund the best selected solutions. This process repeats annually to see if the results of the study and experimental solutions show a reduction in the total number of shark attacks on the human population off the coast of Florida, in specific.

In this theoretical scenario, the scientist's and measurement devices' accuracy, methodology and researched and approved solutions implemented may have been reasonably sufficient for the goals of that particular study and experiment on a group of live organisms in its habitat and its impact on human populations in a particular location. However, the methodology, accuracy and solutions utilized in that scenario would not even yield a single useful measurement in a study of subatomic particles, much less produce measurements of acceptable accuracy in a study of black holes in the galaxies of the universe, whether the studies and experiments were private or publicly funded or conducted voluntarily.

Elsewhere on the planet, a young boy clearly sees the light from an event like a person bouncing a basketball far in the distance, but hears the bounce sound of the ball contact with the ground much later over the time domain, and the young boy is confused as he fails to comprehend the event according to his perception system and experience. Nearby, a mixing engineering recording an outdoor vocal performance in the town square picks up a ball bouncing sound, but sees no ball anywhere. He attempts to reduce the ambient recording signal, but the source is too close, and he determines he is stuck with the bouncing ball sound is in his audio recording data. The young boy and mixing engineer are both either confused or unhappy with the results of their perception and ability to understand or influence an event.

So, there is a real-world problem and conflict present today, in that the methodology, assumptions and experiment outcomes can vary significantly between a study or experiment on an event or subject or anything for that matter, simply based on the subject, location, methodology, experimenter, measurement tools available and selected and whether it's a study of living organisms or humans or inorganic matter big or small in the local unique universe over time.

As can be seen, there is a need for a system and method that presents a universal interactive and iterative methodology and system approach/solution not only for humans conducting measurements but for anything and everything.

SUMMARY OF THE INVENTION

In one aspect of the present invention, a method for making an interactive measurement comprises generating a signal in a space from at least one of a generator/emitter, a sound emitter, a light emitter, and the space itself; transmitting the signal to a first data management/processing device; receiving the generated signal on one or more sensors or receivers; transmitting the received signal to a second data management/processing device; and comparing the generated signal transmitted to the first data management/processing device with the transmitted received signal received by the one or more sensors or receivers to generate a feedback; and analyzing the feedback to make the interactive measurement.

In another aspect of the present invention, a senseroom apparatus, comprises at least one of a generator/emitter, a sound emitter, a light emitter and the senseroom apparatus itself, generating a signal in a space; a first data management/processing device receiving a transmitted generated signal; one or more sensors or receivers sensing the generated signal; a second data management/processing device receiving a transmitted generated signal from the one or more sensors or receivers, wherein the transmitted generated signal transmitted to the first data management/processing device is compared with the transmitted received signal received by the one or more sensors to generate a feedback and the feedback is analyzed to make an interactive measurement or change in the environment.

These and other features, aspects and advantages of the present invention will become better understood with reference to the following drawing, description and claims.

BRIEF DESCRIPTION OF THE DRAWING

The FIGURE is a schematic representation of a senseroom according to an exemplary embodiment of the present invention. The border of a second encapsulating senseroom is also represented in the FIGURE.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides an iterative methodology and system (which can also be represented in software), with the option for continual improvement, for the interactive capture, merger, comparison, analysis, cloning and manipulation of anything in the unique universe medium or multiple universes mediums, be it real, virtual or imagined, including thought (of organic or non-organic or other nature), in real time or non-real time, where anything also includes anything infinitely small (or a small base volume of space known as a Senserom), to infinitely large (or a large encapsulating Senseroom volume known as a Senseverse) and can include multiple universes and Senserooms themselves impacting each other, static or dynamic changing over time periods, including the past, present and future. The full set of these infinite Senseroms and Senserooms is considered the Senseverse, which contains anything and/or everything real, virtual and imagined.

If the most generic definition of SENSE is to detect or perceive and a ROOM is an environment or medium and all in it, even the boundary area or volume, then in a simplified logical way a Senseroom can be considered a methodology or system which interactively detects and can react to anything in the environment, including itself, and any change in the environment over infinitely small to infinitely large periods of time. The size of the room or environment could be infinitely small or infinitely large, and anything real, virtual, or imagined could be sensed, including every property of space, time, matter or anti-matter could be sensed. The ability to utilize feedback loops in the senseroom and between senserooms is extremely useful especially in establishing changes over the time domain.

One example of Senseroom methodology and systems is the Senseverse. The Senseverse is an iterative set of infinitely large senseroom arrangements containing and or linked to an infinite number of smaller senseroom arrangement sets containing or linked to the infinitely smallest senseroom or senseroom of interest. There would be no limitation on size, as the unique universe or universes would not be a boundary on size large or small, and no limitation on period or direction of time large or small.

Any arrangement of a sensor, emitter, absorber, process or system (could be inorganic, organic, or an organism as device) from 1 to N, and a data recorder/processor or environment property/state recorder or data manager (all of which could be inorganic, organic, or an organism as device) from 1 to N, and devices detecting or encapsulating an environment, contiguous or not, up to N environments and also as an option, including a Senseroom system itself, up to N Senserooms, in the sensing and interaction with its environment and interactive data management/processing, over infinitely small to infinitely large periods of time. Senserooms can be linked to one another or impact one another in infinite arrangements. So, iteratively, an infinitely large arrangement of N senserooms can encapsulate, be part of sets and be linked to any number or arrangements of Senserooms, down to a second Senseroom system arranged to encapsulate a first Senseroom system of interest to detect the system itself and any external properties affecting the first Senseroom system and Senseroom methodology being carried out within it.

A senseroom may internal to an organic or non-organic structure or organism, external, both, or infinite combinations thereof.

The below describes an exemplary 21 step process that include iterations for a basic Senseroom methodology. This process can further include many substeps, reordering of steps, extended list, revised list or iterations.

1. register, authenticate, educate and calibrate oneself and members of Senserooms regularly, and note changes;

2. determine the most local broadest encapsulating environment for an event being planned;

3. publish an announcement of the event planned in detail and goals for such event, whether for public or private party and profit or non-profit benefit, and furnish the list of all involved members as soon as known including managers, moderators, administrators and sponsors, the event location and time range, with past and anticipated future states as a result of the event over short and longer term;

4. read other published events and reconsider necessity of event and timing based on feedback and impact upon other events locally and universally, and whether the planned event will proceed as planned, delayed, rescheduled or cancelled;

5. get applicable local and universal approval from governing authorities to conduct the event, and have all involved parties and members sign consent forms to be part of the event;

6. establish the best available universal anchor reference space with the least motion in relation to a closest local reference anchor space with least motion, or if not available, a local position with GPS if no more accurate reference or secured local reference with least motion is available;

7. establish the best available time element and range;

8. arrange the best available system elements;

9. calibrate the system in a more controlled environment with best available external signal interference rejection;

10. calibrate the system in the field with the best available external signal interference rejection;

11. establish a communication link;

12. authenticate the involved members, establish they agree to be monitored and participate in the event, start monitoring and recording each member's real, virtual and imagined roles and establish understanding of the event to occur, their role and the other members roles through completion, confirm recording;

13. conduct event and record data documented over space and over a time range;

14. report any security breaches and/or system failures;

15. a member and/or administrator and/or senseroom itself terminates the event;

16. authenticate, debrief, interview all event participants to describe the event from their perspective, any issues and if event goals were achieved by themselves and others, calibrate oneself and event members again, and note changes;

17. publish event, raw data and interpreted results with time and location data;

18. iterate event data, calculation and results with best available space and time data and universal phenomena sets from external sources and event participants, also allowing possible sets to include monitored event members brain and physical activity while awake and/or dreaming, the resultant memory, logic and concept formation from the event in the short and long-term, learning how their brains and bodies build and link the physical connections from the event participation to their collective memory sets, short term and long-term, and ability to form new concepts and analysis with these new connections established applied to the event or anything else, from then to the future time ranges;

19. refine methodology and process and result analysis based on universal feedback from others;

20. review local and universal impact of the event with governing authorities, and whether the event needs to occur again, should be allowed to occur again or needs be validated elsewhere; and 21. REPEAT to step 1 or loop or iterate any number of steps.

Applications of the Senseroom include everything, including Gaming, Multimedia, Audio, Video, Entertainment, Education, Authentication, Videoconferencing, Math, Physics, Sciences, Psychology, Medical, Sociology, Animal and Organic studies and processes, Satellite, Defense and War Room, Security, Manufacturing, Design, Language, Logic Programming and the like.

Senseroom is a methodology and system that uses any of the following or collection of sensors, emitters, reflectors, absorbers, devices, components, organisms and systems, but not limited to: rulers, clocks, compasses, mirrors, writing implements, writing media, paper, film, data recorders, timers, sets of transparent colored filters/gels, marker or markers, 3d markers, 3d capture suits, face recognition, prisms, temperature gauges or thermostats, heaters, air conditioners, hvac controls, fans, wind gages, solar energy converters, batteries, generators, pressure gauges, coordinate systems, sensors, vacuum chambers, anechoic chambers, air sealed chambers, emitters, absorbers, transmitters, light sources, LEDs, light bulbs, plasma, GPS, radar, sonar, glass, Lexan™, Gorilla Glass™, transparent OLED, OLED, LCDs, tubes, photo cameras, video cameras, televisions, radios, speakers, audio recorders, microphones, light meters, human/humans, human(s) as devices, displays, satellite, fea software, 3d software, modeling software, character generators, webcams, green screen or blue screen systems, voice recognition, audio mixers, video mixers or switchers, computers, storage, processor, compression, decompression, adc, dac, strain gages, accelerometers, radioactivity meters, networks, IP, retina scanners, cube or set of cubes, motion sensors, carbon detectors, oxygen detectors, carbon dioxide detectors, carbon monoxide detectors, software, logic, IR detectors, gamma ray detectors, x-ray detectors, EKG, 3d scanners, 3d printers, depth and volume sensors, control circuits, brain activity scanners, and the like. None of these things by themself are necessarily a Senseroom, but may certainly be used for a senseroom systems.

In theory, the biggest arrangement of a senseroom wins for observing, understanding, interpreting and effecting an event or environment assuming equal accuracy, sensing all others within it, and provides opportunity to control and affect all others "under or within" it.

Senseroom is a methodology and system that uses the above components to measure, analyze, interact with, react to, mimic, clone, any volume, surface or item in the universe, big or small, and all of its properties, real, virtual, imagined in the universe(s). Senserooms use the unique universe or universes as mediums, utilize uniqueness of everything even the smallest and largest sets, as opposed to equal, as even position in the absolute coordinate system has an impact on volumes of space and their contents. Intrinsically, we know that the unique universe in combination with the same process can ultimately yield different results, as position matters.

For example, four wood chair legs cut with same process from even the same tree material, end up near the same dimension, however different grain and consistency of pieces and density, especially upon close examination and especially different number of atoms, subatomic particles, total energy density.

Somewhere in history, a ruling people or population decided to use fingers and counting for simplicity of representation or ease of calculation and comparison, to simplify bartering, count money or for ease of communication of sets of similar things in nature.

There are many limitations, however, of human perception. Simply put, even the humans or organisms that conduct measurements or experiments need to have their perceptual abilities benchmarked and monitored over time, and compared with other organisms. Observed behavior of human perception systems—sensory overload can affect other sensory systems, such as by blinding light, or loud noise or screaming, can affect perception and stun or shut down the organism into a state of incapacity. Also, the brain attempts to merge information into a cohesive comprehensive set of normal expectations and predictions, based on past memory sets and experiences, but events can become confusing to the organism even such as a human. Once again, consider the example, when seeing the light from an event like person basketball bouncing far in the distance, but hearing the effect of the ball contact with the ground much later over the time domain, they often fail to understand the event at first until they are informed about sound and light waves and the differences.

Here is one small example of many unique approaches, this one in particular developed by using an internal senseroom, processing and calculating methodology for analyzing senseroom information and methodology using short and long-term memory, while trying to shut out as much external stimuli as possible. For a few moments, set aside the imaginary concepts of linearity of time, points, equality, origin and coordinate systems with orientation of space into coordinates and preservation of space and energy and dimension/direction.

One of many useful unique approaches to senseroom analysis of volumes or meshes or shapes of space and time and their properties is the following, but not exclusively limited to the following: consider a set of 27 cubes containing volumes of approximate same volume and dimension of space and/or time, arranged in a 3×3×3 array (Note: does not have to be containing cubes of volume, could be amorphous blobs, meshes, matrixes, spheres or other geometric shapes or arrangements, contiguous or disjointed, but optionally easiest to visualize having co-located originating "point" or volume).

The 27 cube sets of space and time do not have to be co-located or of equal size. The center cube, containing volume of the 27 cube set, contains the same rough "origin" location of the set of 27 cubes in the 3×3×3 array. This 27 cube arrangement may iterate to be infinitely small or infinitely large (yes, even containing the universe(s) real, virtual or imagined). An event occurs in the senseroom environment, real, virtual or imagined. The event occurs within the set volume of space and/or time and may be bound within the center cube of this 27 cube arrangement, or sets of 27 cube arrangements of differing sizes and locations. The event may have immediately preceded and passed through the set volume location or time span, and the path and boundaries crossed by the event would be useful for analyzing past, near present and future states of the event. The boundaries of the event may be further resolved through infinitely smaller or larger sets of the cube arrangement.

With this arrangement, go in the infinitely small iteration below the size of a photon and subatomic particles, it has no visible property to organisms like humans or below. The 27 cube volumes at this resolution can continually be iterated smaller until one gets to a size and arrangement of unique cube volume of interest or useful for our purposes where we'd like to observe and interact with our unique universe(s). This volume may be considered the unique universal volume of space and time and energy with an unlimited amount of properties, phases and contents (think of an egg or ice cube for example), which may or may not be created or manipulated by an organic or non-organic process or organism(s) or creator(s), in the universe(s).

To use a simple naming convention, let's call this containing volume of space a "Senserom" with a size dimension of approximately 1×1×1 "Senstrom" and let's call the minimum volume of energy to collapse or maintain the volume a "Senserum" and let's call the internal and external pressure the Senserom exerts on the universe(s) a "Senserem", and volume of time a "Sensespan". Therefore, a Senseroom contains a unique set of Sensrom in motion over a time range period of Sensespan and so forth. The full set of these infinite Senseroms in all their phases and subcomponents and Senserooms is considered the "Senseverse", which contains anything and everything real, virtual and imagined (Note: Everything includes our real or perceivable universe(s)).

Properties and phases are contained in these volume sets of space and time and the sets can deform to let relatively enormous photons and subatomic particles to pass through seemingly uninhibited and/or they collide, interact and bounce off. The energy dissipation and force of the collisions may be considered present but minor even relative to the force of a Hydrogen proton of air passing through or colliding with a cannon ball falling through the sky having reached terminal velocity in the air medium.

The Senserom may have an infinite number of possible phases, but, for ease of analysis, let's focus from 1 to 3 such as gas, liquid and solid. The local unique universe(s) has a lot of the gas phase of Senserom, and the Sensrom gas phase fills the gaps between the liquid and solid phases of Senseroms.

Like other matter observable and contained in volumes and times of the universe(s), Senseroms can have 1-3 or more phases useful for observations. At this Senserom level, the volumes are so densely packed and arranged that nothing larger escapes between the volumes, except the subcomponents of the gas phases, yet the "friction" and resulting forces from deformation between the volume pockets and solid and liquid phases continually reorganizing could classified as energy or other force, which also maintains the cohesive volume structure and pressure structure of the volumes so they don't continually internally collapse into infinitely smaller volumes.

The smallest found volume of energy to maintain this volume structure of interest that exerts force to retain the structure volume without spontaneously collapsing is there defined as a "senserum". Therefore, one can classify and analyze and quantify volumes of energy and pressure and other properties of space and time exerted on and exchanged with the sets of Sensroms, either onto and/or with the smallest of subatomic particles, either preventing them from spontaneously disintegrating into finer mist or vapor states of smaller volumes or subparticles.

A senserom may contain an unlimited number of phases, contents and properties and assume an unlimited number of structures with or without unique characteristics and properties. Once again, the Sensrom may be considered a near-infinite small containing volume with properties with infinite number of subdivisions, and not necessarily a singular particle. The smallest of subatomic particles can attain their terminal velocity passing through, colliding and interacting with the Senserom.

A desired goal is to locate and anchor Senseroom systems to the closest and furthest Senserom with minimal motion in the universe(s). In a sense, these containing volumes over time may be considered building block volume units and anchor points of the Senseverse.

When sufficient volumes of space and energy over time are accumulated, Sensroms may form and retain subatomic particles of a photon of light, and collections of these on a massive scale may also be witnessed during static energy discharge even on the enormous level of human visual perception, which one considers small yet in the atomic and subatomic sense considerable in respect to massive events such as lightning and the suns much larger visible evidence in the universe(s).

Very large collections of matter that collide and spin through the Senseverse over time in various shapes, states and phases spinning and rotating are worn as they travel through the senserom as they exchange matter and energy and eventually are finely worn to the point at the boundaries that the rough edges are polished fairly smooth, such as to a shape of a sphere with an near infinite number of rough conjoined edges at the smallest level of analysis, also giving witness of senserom interactions.

As senseroom feedback and iterative methodology reveals, the medium of the unique real universe is a direct witness to the immediate present, a record of the past events and a predictor of the immediate future events.

Once again, the full set of these infinite Senseroms and Senserooms is considered the "Senseverse", which contains anything and everything real, virtual and imagined over time and space.

Just as logical imaginary concepts and things can be imagined by living organisms in this unique universe medium, verbalizations and virtual representations created with computers and art, and processes created to manufacture these real things using organic and non-organic matter in the real universe, so can they be imagined, virtualized and created in the Senseverse without limitations for normal logic or current reality.

The senseroom methodology for quickly analyzing volumes of space and time has often been utilized to interactively analyze and effect short duration events, quick and easy to analyze near present, near, past and near near past states of an event in the environment in a feedback loop through the use of light with reflectors like mirrors, light emitting devices such as displays or monitors, TV's with light emitting and sound emitting with volume and brightness control, sound devices and recorders with near-real time processing and short and long-term storage. This loop could be utilized to much more accurately understand events in the environment over time volumes.

Depending on the rate of capture and sample rate, and arrangements of the devices, it was much easier to understand an event as a whole in non-realtime, since in effect it was much easier to visualize and analyze than from memory or simple sensor readout.

Referring to the FIGURE, an exemplary senseroom can include a plurality of emitters, reflectors, generators, transmitters, reflectors, filters, mirrors, displays, video recorders and the like. For example, the senseroom 10 can include a senserom generator/emitter 50 and a senserom generator/emitter 52 connected to a data manager/processor 22 having, for example, a readout display 64. The senseroom 10 can further include a first sound emitter 40 and a second sound emitter 42, both of which are also connected to the data manager/processor 22. Moreover, the senseroom 10 can include a first light emitter 30 and a second light emitter 32, both of which are connected to the data manager/processor 22. The devices 50, 52, 40, 42, 30, 32 can be connected by wires 34 or by a wireless path or link and each of these devices can be interconnected or linked through the data manager/processor 22. Additional devices 56, in essence, up to N emitters, reflectors, generators, transmitters, and the like can be arranged in the senseroom 10 in any type of arrangement. The senseroom 10 can also include from 1 up to N external senseroom shields 58, 60 or passthroughs, rejectors, deflectors, defenders, or the like.

An environment 16 where event(s) or experiment(s) occurs can be within the senseroom and it can be attached or unattached to the staging area. The devices 50, 52, 40, 42, 30, 32, and the like, can act on the event(s) or experiment(s) of environment 16. The staging area can be contiguous within the senseroom, can be separate from the senseroom, floating in space, and can be infinitely small or large. The staging area may contain scales or lengths or sensors of measure of length or volume 12, and pressure sensitive areas and weight scales 14.

The senseroom 10 can also include a first light sensor 26 and a second light sensor 28, a first sound sensor 36 and a second sound sensor 38, and a first senserom sensor/receiver 46 and a second senserom sensor/receiver 48. Each of these sensors 26, 28, 36, 38, 46, 48 can be connected with a data manager/processor 18 having a display readout 62. Additional sensors/absorbers/receivers 54, up to N sensors and the like, can be present in the senseroom. An internal communication link 24 can interconnect the data managers/processors 18, 22 for synchronization or communication and an external communication link 20 can interconnect an infinite number of senserooms together.

Data managers/processors 18, 22 and the like up to N, can be data devices and modifiers, recorders, medium recorders, filters, controllers/processors with gain and feedback control of up to N devices or I/O, with or without attached or unattached readout of time or a timer or any data, with or without self-monitoring and self or external termination, local position and time anchor, ground, and power source. The sensors and data sets and processes may be real time or non-real time and include real, virtual and imagined sets, such as organism thought, CAD/CAM drawings and modeled processes, data from pressure, temperature, humidity, volume, depth, GPS data, olfactory, carbon, IR, radiation readings, language, software, logic, internet news and data feeds, history, dream data and the like.

Other senserooms can be the same or different in design, linked or not linked, inter-reacting or not, encapsulating it wholly, partly or not at all, part of set or not, and they may be infinitely small or large through total N senseroom systems. The collection set of all senserooms—real, virtual or imagined over all space and time—is the senseverse. An example of an encapsulating senseroom is the boundary line of second senseroom 66.

It should be understood, of course, that the foregoing relates to exemplary embodiments of the invention and that modifications may be made without departing from the spirit and scope of the invention as set forth in the following claims.

What is claimed is:

1. A method for making an interactive measurement comprising:
    generating a signal in a space from at least one of a generator or emitter, a sound emitter, and a light emitter;
    transmitting the signal directly to a first data management or processing device;
    receiving the signal, as a received signal, on one or more sensors or receivers in the space;
    transmitting the received signal to a second data management or processing device; and
    comparing the signal transmitted to the first data management or processing device with the received signal received by the one or more sensors or receivers to generate a feedback; and
    analyzing the feedback to make the interactive measurement.

2. The method of claim 1, wherein the signal is generated from any number of emitters, reflectors, generators, and transmitters in any arrangement.

3. The method of claim 1, wherein the one or more sensors includes any number of sensors to sense one or more of brain activity, drawings, modeled processes, pressure, temperature, humidity, volume, depth, GPS data, carbon, infrared, radiation readings, language, software logic, internet news and data feeds, and history.

4. The method of claim 1, wherein the first data management or processing device is linked to the second data management or processing device by an internal communication link.

5. The method of claim 1, further comprising interconnecting the space with one or more additional spaces.

6. The method of claim 5, further comprising linking the space with one or more additional spaces, where the link creates an interaction between spaces.

7. A senseroom apparatus, comprising:
- at least one of a generator or emitter, a sound emitter, and a light emitter generating a signal in a space;
- a first data management or processing device directly receiving the signal;
- one or more sensors or receivers in the space sensing the signal as a received signal;
- a second data management or processing device receiving the received signal from the one or more sensors or receivers, wherein
- the signal transmitted to the first data management or processing device is compared with the received signal received by the one or more sensors to generate a feedback and the feedback is analyzed to make an interactive measurement or change in the environment.

8. The senseroom apparatus of claim 7, wherein the signal is generated from any number of emitters, reflectors, generators, and transmitters in any arrangement.

9. The senseroom apparatus of claim 7, wherein the one or more sensors includes any number of sensors to sense one or more of brain activity, drawings, modeled processes, pressure, temperature, humidity, volume, depth, GPS data, carbon, infrared, radiation readings, language, software logic, internet news and data feeds, and history.

10. The senseroom apparatus of claim 7, wherein the first data management or processing device is linked to the second data management or processing device by an internal communication link.

11. The senseroom apparatus of claim 7, further comprising one or more additional spaces interconnected with the space.

12. The senseroom apparatus of claim 11, further comprising linking the space with one or more additional spaces, where the link creates an interaction between spaces.

* * * * *